United States Patent
Hristu et al.

(10) Patent No.: US 11,269,756 B1
(45) Date of Patent: Mar. 8, 2022

(54) SELF-HEALING WEB APPLICATIONS

(71) Applicant: A9.com, Inc., Palo Alto, CA (US)

(72) Inventors: Horia James Hristu, Seattle, WA (US); David Uvalle, Seattle, WA (US)

(73) Assignee: A9.COM, INC., Palo Alto, CA (US)

( * ) Notice: Subject to any disclaimer, the term of this patent is extended or adjusted under 35 U.S.C. 154(b) by 92 days.

(21) Appl. No.: 16/142,878

(22) Filed: Sep. 26, 2018

(51) Int. Cl.
  *G06F 11/00* (2006.01)
  *G06F 11/36* (2006.01)
  *G06F 11/07* (2006.01)

(52) U.S. Cl.
  CPC ........ *G06F 11/3612* (2013.01); *G06F 11/079* (2013.01)

(58) Field of Classification Search
  CPC ............... G06F 11/3696; G06F 11/079; G06F 9/45529; G06F 9/547; G06F 3/04817; G06F 3/0481; G05B 2219/32126; G05B 2219/36037
  See application file for complete search history.

(56) References Cited

U.S. PATENT DOCUMENTS

| | | | |
|---|---|---|---|
| 2015/0369623 A1* | 12/2015 | Blumenberg | G06T 3/40 701/532 |
| 2016/0323399 A1* | 11/2016 | Katsev | G06F 11/3438 |
| 2017/0206187 A1* | 7/2017 | Levi | G06F 40/197 |
| 2018/0239681 A1* | 8/2018 | Ligman | G06F 11/302 |
| 2018/0329813 A1* | 11/2018 | Hamid | G06F 11/3688 |
| 2019/0303269 A1* | 10/2019 | Arieli | G06F 16/958 |

OTHER PUBLICATIONS

NPL: Google Scholar/Patents—text refined (Year: 2020).*
Google Scholar/Patents—text refined (Year: 2021).*

* cited by examiner

*Primary Examiner* — Christopher S McCarthy
(74) *Attorney, Agent, or Firm* — Hogan Lovells US LLP

(57) ABSTRACT

Various embodiments provide for determining problematic components of an application that may cause user experience issues when running the application, and preemptively turning off or disabling the problematic components so that the application is rendered without the problematic component. When a component is rendered, various runtime data is produced. Such data may be logged and analyzed, and used to generate performance metrics of the component. Such performance metrics can be used to determine whether a component should be disabled. When a component is disabled, it become unavailable and will be excluded from the application when the application is rendered and/or served to a user. Thus, when an application is rendered or served, only available or enabled components are included.

19 Claims, 10 Drawing Sheets

SELF-HEALING WEB APPLICATIONS

BACKGROUND

Users are increasingly utilizing computing devices to access various types of content. For example, an Internet user may access network resources such as web sites offering items, products, or services for sale. Web sites may contain web applications for rendering many different types of content, often on the same page and in near proximity to each other. The content may include information about each item, such as price, description, images, availability and other types of data associated with the item. The content may further contain a significant amount of additional information, such as customer reviews, advertisements, related products, hyperlinks to related network resources, and the like. The content is typically rendered on a user device based on code from a remote server and thus is susceptible to various issues related to network connectivity, traffic, server state, the application source code, the user device, among others. Such issues may cause various performance issues such as latency, a broken page, fatal errors, among other issues that can degrade the user experience.

BRIEF DESCRIPTION OF THE DRAWINGS

Various embodiments in accordance with the present disclosure will be described with reference to the drawings, in which.

DETAILED DESCRIPTION

Figure 1A:
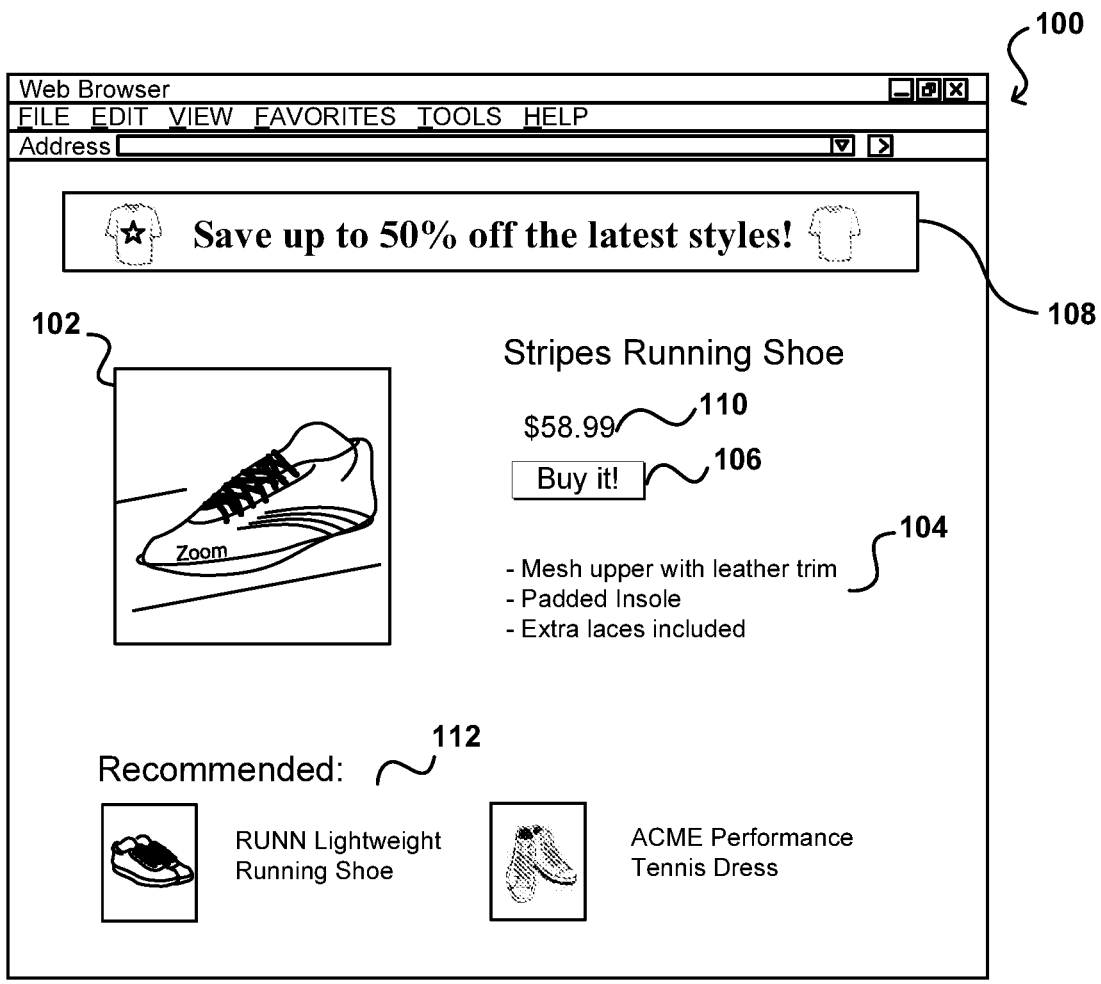
FIG. 1A illustrates an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches for rendering web content. In particular, various embodiments provide for determining problematic components of an application that may cause user experience issues when running the application, and preemptively turning off or disabling the problematic components so that the application is rendered without the problematic component. Specifically, in some embodiments, a web application such as a product search application may include various components, such as a primary product description component, a secondary product description component, a recommendation component, a recently viewed component, and the like. Some of these components may be defined as essential components, such as the primary product description component which may include essential information such as product title, image, and price. Some components may be defined as non-essential components, such as the recommendation component, the recently viewed component, and the secondary product description component, which may include non-essential information such as seller, rating, reviews, etc.

As mentioned, such components may sometimes contain bugs or other issues that may affect its own rendering and even the rendering of other portions of the application or page. When a component is rendered, various runtime data is produced, such as load time, network performance, errors, exceptions, among others. Such data may be logged and analyzed, and used to generate performance metrics of the component. Such performance metrics can be used to determine whether a component should be disabled. For example, if a component is causing a threshold amount of latency or loading errors, it may be deemed unhealthy and disabled. When a component is disabled, it become unavailable and will be excluded from the application when the application is rendered and/or served to a user. Thus, when an application is rendered or served, only available or enabled components are included. When a component is disabled, a notification may be generated and transmitted to a predetermined recipient informing that the component has been disabled and requires attention or further troubleshooting. Once the component is fixed, it may be enabled and available for inclusion in the application again. In some embodiments, a component may be disabled due to transient issues, such as problems with a network, a server, or the user device, rather than problems with the component itself. In such cases, the component may be automatically enabled once the transient issue is resolved.

Various other features and application can be implemented based on, and thus practice, the above described technology and presently disclosed techniques. Accordingly, approaches in accordance with various embodiments undefined Various other applications, processes, and uses are presented below with respect to the various embodiments, each of which improves the operation and performance of the computing device(s) on which they are implemented.

FIG. 1A illustrates an environment in which various embodiments can be implemented. Specifically, this example illustrates a display 100 of content, such as a product page on an ecommerce website. In this example, a user has requested a product page that includes various content, such as content corresponding to the product of interest to the user, which is a jacket in this example. The content can include, for example, an image 102 of the jacket, a description 104 of the jacket, a buy button 106 to purchase the jacket, a price 110 for the jacket, and other such information or content. While a page of content relating to an item is presented for purposes of explanation, it should be understood that other types of content, such as search results, electronic book content, multimedia content, and the like, can be presented to a user via a computing device as well within the scope of the various embodiments.

As illustrated, the content of the display 100 can also include an advertisement 108 displayed with the content. The advertisement might be provided with the content by the content provided, or dynamically obtained from a third party and displayed with the content, according to configurations set by the content provider. Furthermore, the content of the display 100 may also include a section for recommended items 112, which may include items that the content provider determines the user may be interested in, based on the current product, the user's history, or various other factors. The user may interact with such content accordingly. For example, the advertisement 108, the buy button 106, and the recommended items 112 may be clickable elements while the product description 104 and the price 110 may be displayed text that are not interactive. These examples of content can have respective designated positions on the display 100. For example, the advertisement 108 may be display on the top of the screen in a banner configuration, and the recommended items 112 may be displayed directly below the featured product information. These are merely examples of types of content that can be a part of the display 100. It should be understood that numerous other types of content can be a part of the display 100. When the webpage is requested, it may be rendered including such content. Specifically, the code from which the webpage is rendered may include code for rending such content.

Figure 1B:
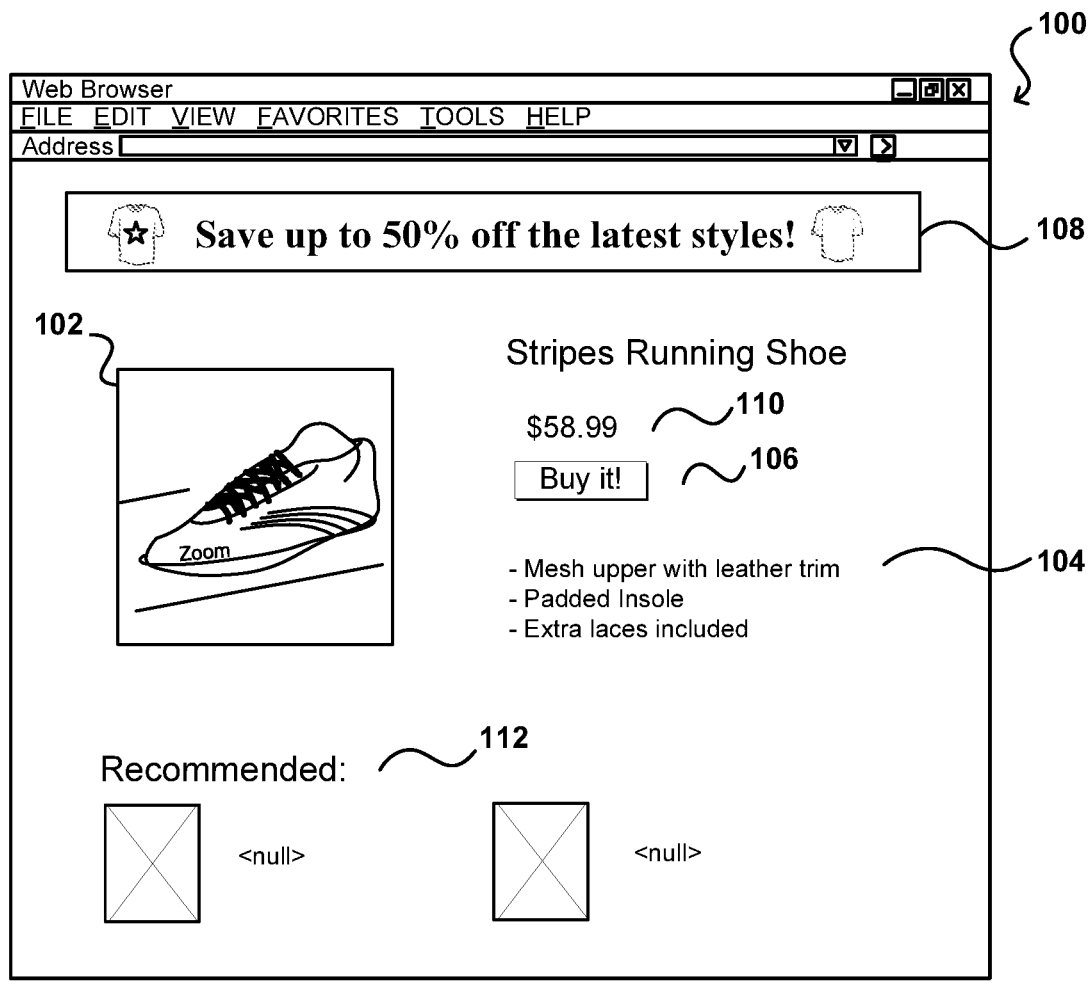
FIG. 1B illustrates an environment in which various embodiments can be implemented.

FIG. 1B illustrates an environment in which various embodiments can be implemented. While FIG. 1A illustrates a scenario in which the product page is rendered correctly, it may be the case that the code from which the product page contains errors. FIG. 1B illustrates such a scenario in which the web page is rendered with errors. Specifically, as illustrated, the recommended items 112 are rendered with errors. The images for the recommended items 112 that are supposed to be displayed are absent and replaced with image placeholders, and the items titles are shown as "<null>". This may indicate bugs in the code of the webpage related to the recommended items 112, data availability issues, network issues, among others. Thus, when the webpage is rendered, the recommended items 112 are not correctly rendered. Such errors, among other potential errors, may be displayed to the user, which may be aesthetically unpleasing, confusing, and overall degrade the user experience as well as the perceived quality of the webpage and content provider.

Various embodiments of the present disclosure provide for determining defining portions or content of a web application (e.g., web page) as discrete components that can be enabled or disabled. Various embodiments also provide for detecting problematic components of an application that may cause user experience issues when running the application, and preemptively turning off or disabling the problematic components so that the application is rendered without the problematic component.

Figure 2:
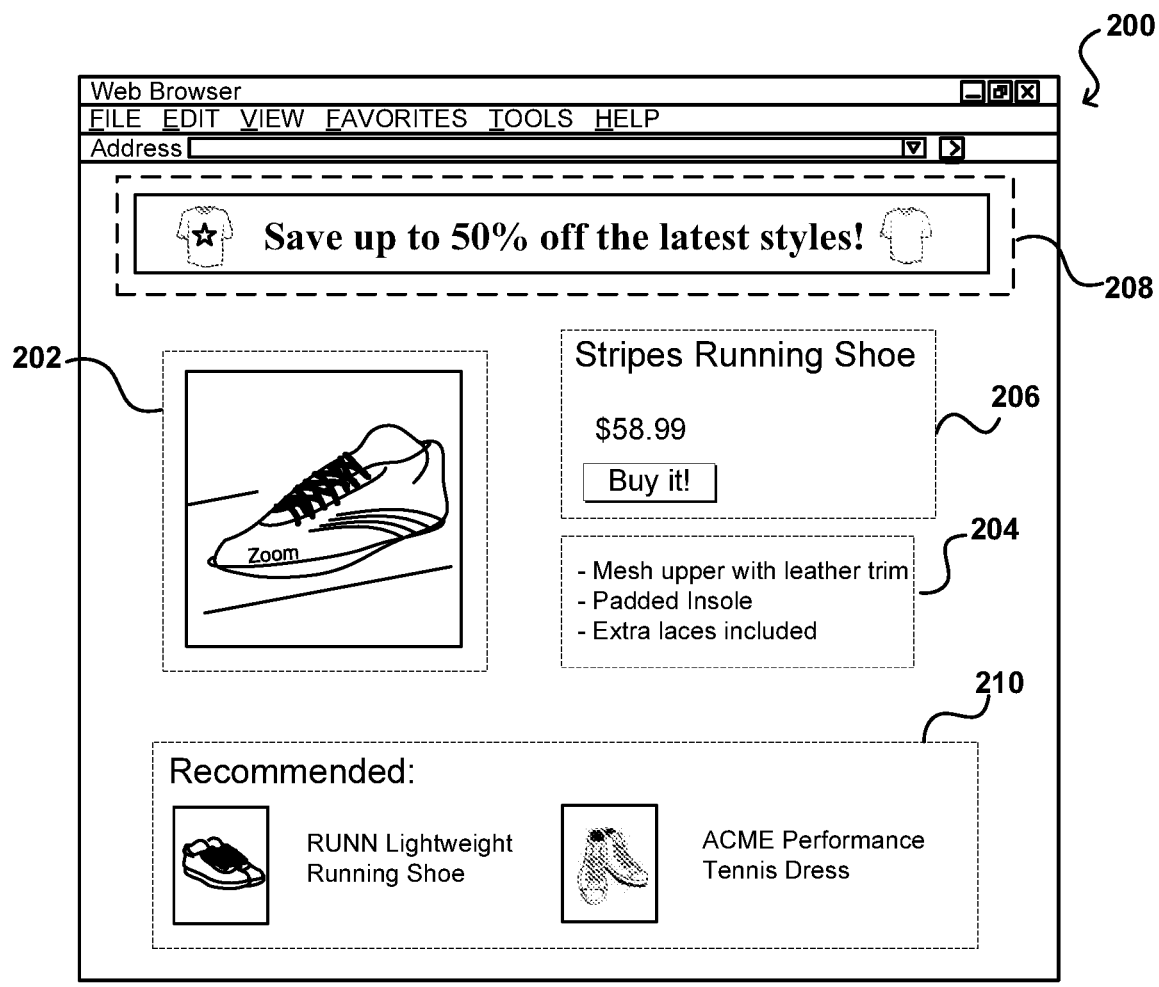
FIG. 2 illustrates various components of a web application, in accordance with various embodiments of the present disclosure.

FIG. 2 illustrates various components of a web application, in accordance with various embodiments of the present disclosure. Specifically, in some embodiments, a web application such as a product page may include various components, such as a product image component 202, a primary product description component 206, a secondary product description component 204, a recommended products component 210, an advertisement component 208, and the like. Some of these components may be defined as essential components. In this example, the product image component 202 and the primary product description component 206 may be designated as essential components. In some embodiments, the essential components must be included each time the web application is served or rendered. Some components may be defined as non-essential components, such as the secondary product description component 206, the advertisement component 208, and the recommended products component 210. Components designated as non-essential components are generally included when the web application is rendered or served when its performance is healthy and not causing performance issues. Non-essential components may be disabled, or excluded from the web application when it may cause performance issues. Essentially, it may be predetermined it is overall better to exclude the component when it is not performing well (e.g., causing slow load time, generating errors) than to include it and potentially degrade the user experience. In some embodiments, there may not be a statutory distinction between the components such as essential components and non-essential components. Rather, each component may possibly be disabled, depending on whether it performance meets a predetermined acceptable performance threshold for that component. For example, the more important a component, the more lax the acceptable performance threshold may be for that component, meaning it may be worth it to include the component even if it causes some degradation in performance. Conversely, the less important a component is, the more stringent the acceptable performance threshold, meaning it may not be worth it to include the component if it even causes a little degradation in performance. The specific thresholds for each component and for each performance metric may be individually predetermined.

As illustrated in FIG. 2, components of the web application may be associated with rendering respective portions of the user interface. Some components may also be responsible for certain features or function of the web application, including those running in the background and not necessarily explicitly seen by a user. For example, a component may be a particular ranking algorithm. In some embodiments, the component may be a body of code in the web application or called from the web application. The code associated with a particular component may be designated or packaged such that it can be distinguished from other code and such that it can be disabled without disrupting the rest of the web application. For example, in some embodiments, when a component is disabled, the block of code corresponding to the component may be commented out, skipped, set to "display: none". The web application may also be prevented from calling a function or subroutine associated with that component. There may be various ways of disabling a component or taking a component offline such that it is not rendered. The specific means may depend on the type of programming language or code integration means associated with the web application or server. In certain embodiments, a software development kit (SDK) may be provided that allows the web application to be separated into the discrete components described herein. Thus, the granularity of components can be defined based on various requirements and/or specifications. For example, in one embodiment, the primary product description component 206 and the secondary product description component 204 may be defined as two distinct components, and can be disabled or enabled independently. However, in another embodiment, the content of the primary product description component 206 and the content of the secondary product description component 204 may be defined as a single component.

Components may sometimes contain bugs or other issues that may affect its own rendering and even the rendering of other portions of the application or page. When a component is rendered, various runtime data is produced, such as load time, network performance, errors, exceptions, among others. Such data may be logged and analyzed, and used to generate performance metrics of the component. Such performance metrics can be used to determine whether a component should be disabled. For example, if a component is causing a threshold amount of latency or loading errors, it may be deemed unhealthy and disabled. When a component is disabled, it become unavailable and will be excluded from the application when the application is rendered and/or served to a user. Thus, when an application is rendered or served, only available or enabled components are included. When a component is disabled, a notification may be generated and transmitted to a predetermined recipient informing that the component has been disabled and requires attention or further troubleshooting. Once the component is fixed, it may be enabled and available for inclusion in the application again. In some embodiments, a component may be disabled due to transient issues, such as problems with a network, a server, traffic, or the user device, rather than problems with the component itself. In such cases, the component may be automatically enabled once the transient issue is resolved.

Figure 3:
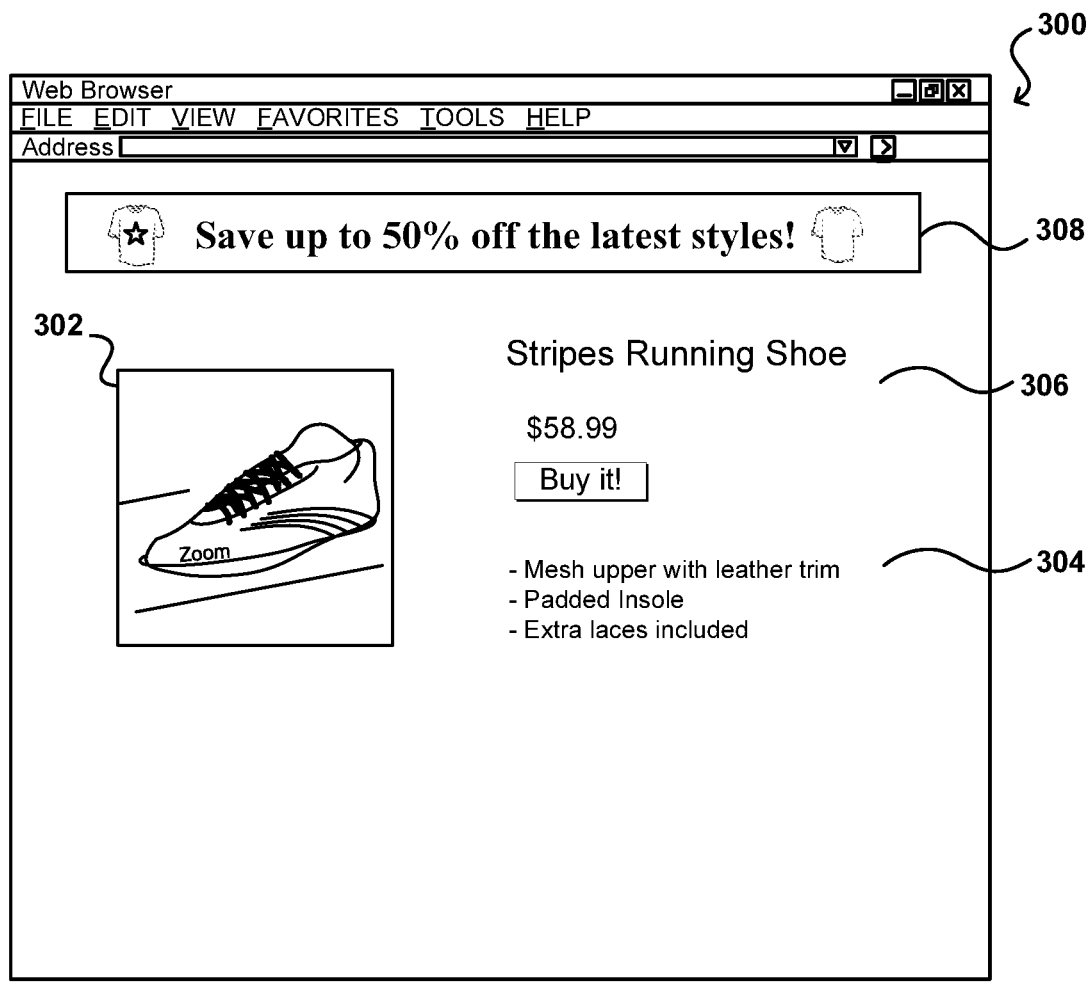
FIG. 3 illustrates a self-healing web application, in accordance with various embodiments of the present disclosure.

FIG. 3 illustrates a self-healing web application in which a component has been disabled and the web application is rendered without that component, in accordance with various embodiments of the present disclosure. Specifically, in this example, the problematic recommended products component 112 shown in FIG. 1B has been disabled. Thus, it is not included in the rendered web application shown in FIG. 3. Thus, instead of showing the user the broken component illustrated in FIG. 1B, the broken component is simply not included in the web application, thereby still providing a clean interface. The other healthy components are still rendered normally. In some embodiments, disabled components are simple not shown. In some embodiments, disabled components may be replaced by a backup component in its place, or a previous functional version of the component. Thus, the space left by the disabled component may still be filled, thereby fully utilizing valuable visual real estate and maintaining the integrity of the original user interface and user experience design.

Figure 4:
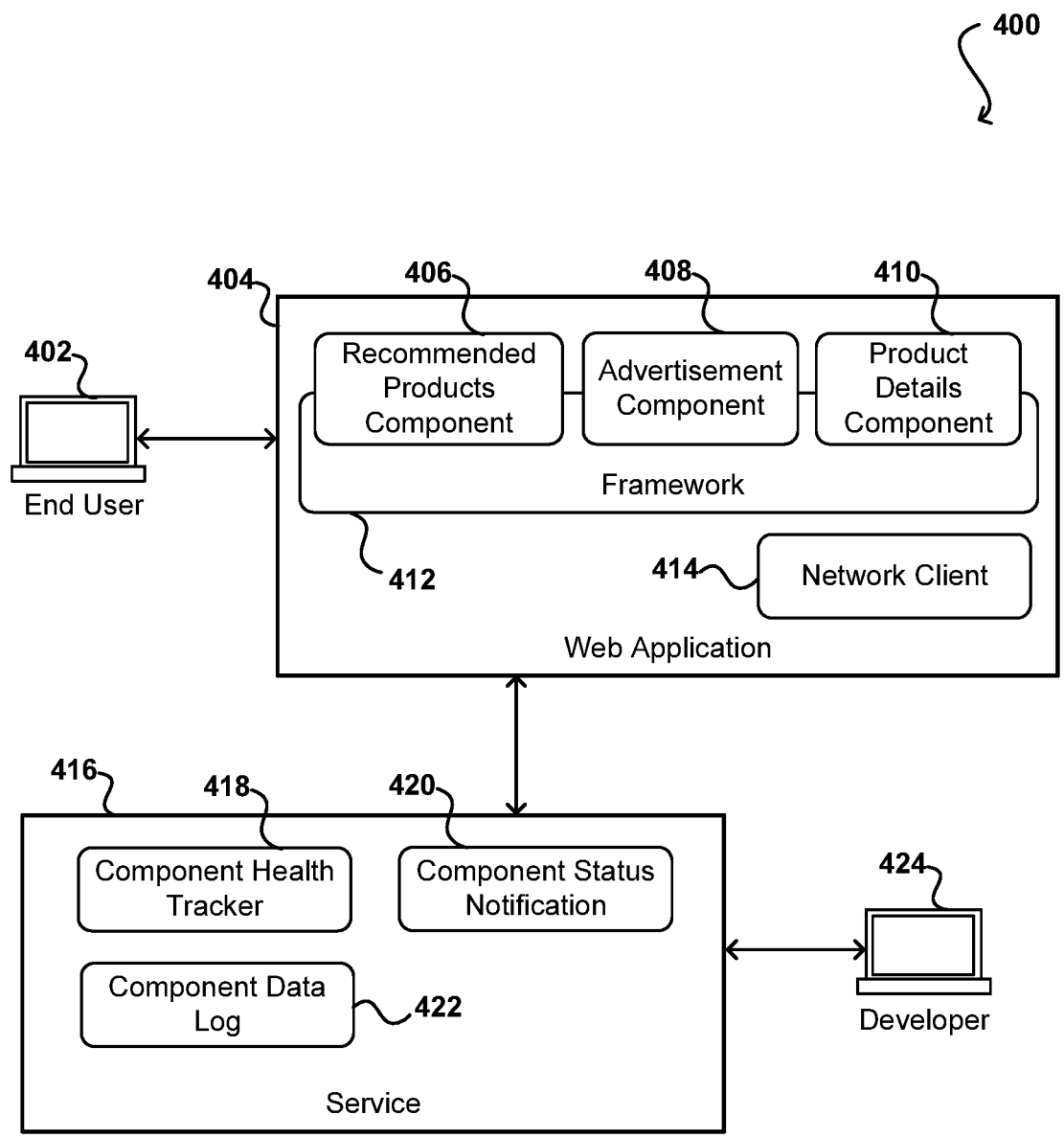
FIG. 4 illustrates a representation of an example architecture for self-healing web applications, in accordance with various embodiments of the present disclosure.

FIG. 4 illustrates a representation of an example architecture 400 for self-healing web applications, in accordance with various embodiments of the present disclosure. In this example, an end user device 402 may access a web application 404, such as via a web browser. The web application may be served to the end user device 402 in the form of browser compatible code, which may be rendered for view and interaction by the user. In some embodiments, the web application 404 may be a desktop app that does not require a browser. The web application 404 may include one or more components. In this example, the components are a recommended products component 406, and advertisement component 408, and a product details component 410. Each of these components may be defined via a framework 412, which allows each component to be a distinct part of the web application and independently enabled and disabled. The framework 412, when instructed, can disable and enable any of the components without disrupting the rest of the web application.

The framework 412 may connect to a network enabled client 414 to connect to a service 416. The client may act as an intermediary between the service 416 and the web application 404. The client 414 may provide runtime data of the components to the service 416 and receive instructions regarding enabling and disabling components from the service 416. Specifically, the service 416 may include a component health tracker 418, may receive various runtime data. The data may be logged and analyzed, and used to generate performance metrics of the component. In some embodiments, a component database 520 may be used to log the runtime data collected from various rendering instances as well as any performance metrics generated from the runtime data. The runtime data can be used to determine whether a component should be disabled. For example, if a component is causing a threshold amount of latency or loading errors, it may be deemed unhealthy and disabled and therefore unavailable for inclusion in the web application. The status or health of each component may be logged in the a component data log 422. Thus, the service 416 may provide instructions to the framework 412 via the network client 414 for enabling or disabling a component. In some embodiments, the service 416 may also include a component status notification module 420 that can generate notifications when a component status changes. For example, a notification may be generated and transmitted to a developer device 424. The developer device 424 can perform various action in response to the notification. For example, the developer device 424 may be used to debug or fix the problematic component and supply an updated version of the component, and remotely re-enable the component. In some embodiments, the developer device 424 may also be used to define the components in the framework via a software development kit (SDK), and provide the code corresponding to one or more of the components.

As should be understood, the particular architecture represented in FIG. 4 is one of many embodiments and configurations that remain within the scope of the present disclosure. The system described herein may be implemented in many other configurations and the techniques described herein are agnostic to particular architecture or implementation details.

Figure 5:
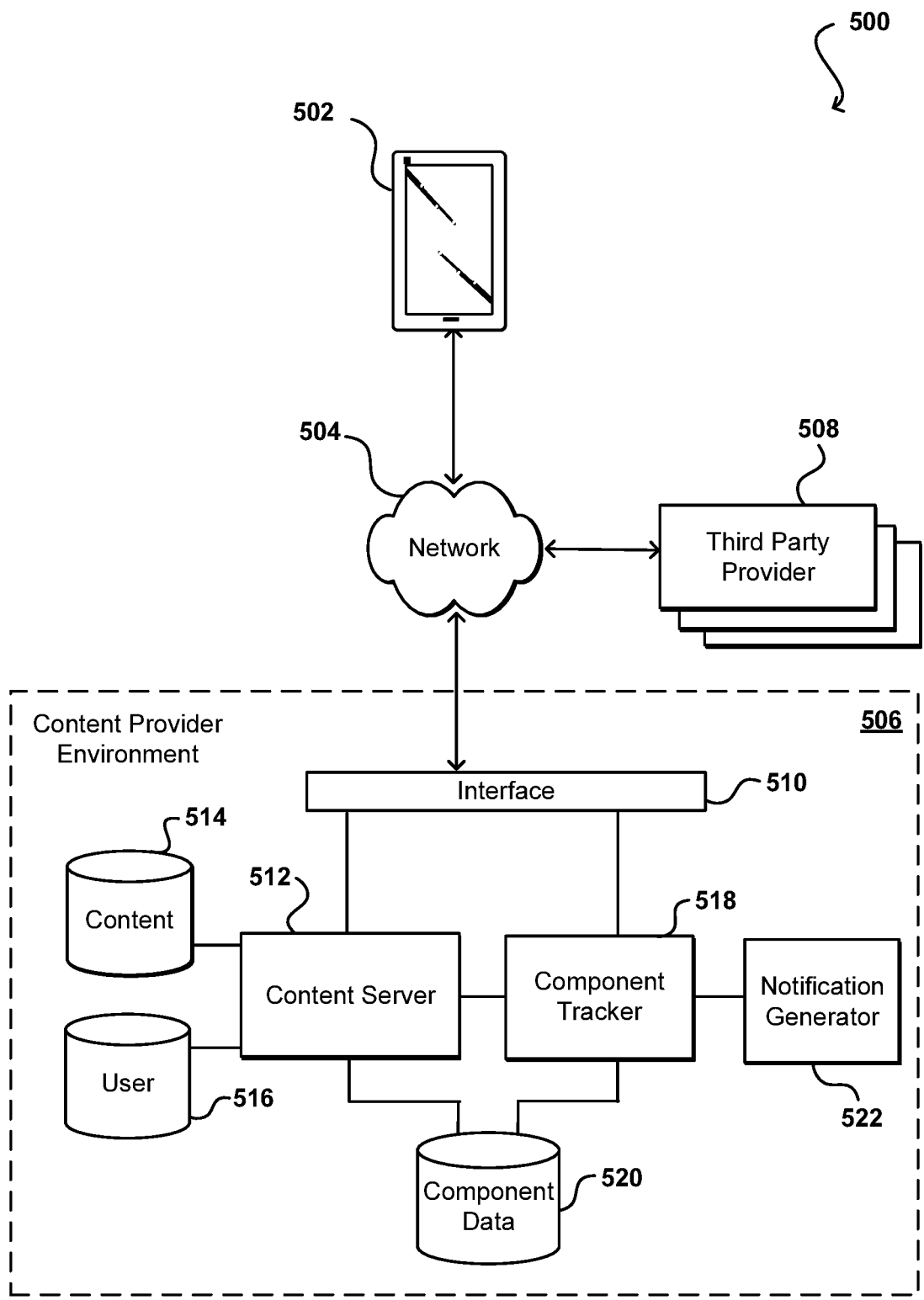
FIG. 5 illustrates an example system for self-healing web applications that can be utilized in accordance with various embodiments.

FIG. 5 illustrates an example system for self-healing web applications that can be utilized in accordance with various embodiments. In accordance with various embodiments of the present disclosure, the system 500 provides for determining problematic components of an application that may cause user experience issues when running the application, and preemptively turning off or disabling the problematic components so that the application is rendered without the problematic component. A user is able to utilize a user device 502 to submit requests across at least one network 504 to a content provider environment 506. The request may be a request for a web application or particular function or feature of the web application, among other such options. For example, the request may include a search on a product search application. The user device 502 can include any appropriate electronic device operable to send and receive requests, messages, or other such information over an appropriate network and convey information back to a user of the device. Examples of such client devices include personal computers, tablet computers, smart phones, notebook computers, and the like. The at least one network 504 can include any appropriate network, including an intranet, the Internet, a cellular network, a local area network (LAN), or any other such network or combination, and communication over the network can be enabled via wired and/or wireless connections. The content provider environment 506 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources of one or more types. These types can include, for example, application servers operable to process instructions provided by a user or database servers operable to process data stored in one or more data stores in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a web application can submit a request that is received to an interface layer 510 of the provider environment 506. The interface layer can include application programming interfaces (APIs) or other exposed interfaces enabling a user to submit requests to the provider environment. The interface layer 510 in this example can also include other components as well, such as at least one Web server, routing components, load balancers, and the like. When a request to provision a resource is received to the interface layer 510, information for the request can be directed to a resource manager or other such system, service, or component configured to manage user accounts and information, resource provisioning and usage, and other such aspects. A resource manager receiving the request can perform tasks such as to authenticate an identity of the user submitting the request, as well as to determine whether that user has an existing account with the content provider, where the account data may be stored in at least one data store in the provider environment. A user can provide any of various types of credentials in order to authenticate an identity of the user to the provider. These credentials can include, for example, a username and password pair, biometric data, a digital signature, or other such information.

The interface layer 510 can receive and analyze a request received from the user device 502, and cause at least a portion of the information in the request to be directed to an appropriate system or service, such as a content server 512 (e.g., a Web server or application server). In some embodiments, the interface layer 510 may translate a received user input (i.e., front-end input) into a request to be processed by the content server 512. The content server 512 may execute various instructions or protocol upon receiving a request. Specifically, the content server may execute certain processing and analysis steps in order to provide a response to the request back to the user device 502. For example the content server 512 may generate or produce code that can be run at the user device 502 to render the requested Web page and/or application. In some embodiments, the content server 512 may access a content database 514 to obtain the content for generating a response. Specifically, in some embodiments, the content database 514 may include code and/or data for rendering the request web application. For example, in some embodiments, a web application such as a product search application may include various components, such as a primary product description component, a secondary product description component, a recommendation component, a recently viewed component, and the like. Some of these components may be defined as essential components, such as the primary product description component which may include essential information such as product title, image, and price. Some components may be defined as non-essential components, such as the recommendation component, the recently viewed component, and the secondary product description component, which may include non-essential information such as seller, rating, reviews, etc.

In some embodiments, at least some aspect of the web application may be personalized based on the user requesting the application. Data associated with the users may be stored in a user database 516. In some embodiments, content may also be provided by a third party provider 508. For example, the web application may include an advertisement component, and the content to be provided to the user may be provided by the third party provider 508.

As mentioned, components may sometimes contain bugs or other issues that may affect its own rendering and even the rendering of other portions of the application or page. When a component is rendered at the user device 502, various runtime data is produced, such as load time, network performance, errors, exceptions, among others. A component tracker 518 may receive such data. The data may be logged and analyzed, and used to generate performance metrics of the component. In some embodiments, a component database 520 may be used to log the runtime data collected from various rendering instances as well as any performance metrics generated from the runtime data. Runtime data may refer to the data collected from one particular instance of the component being rendered. Performance metrics may be generated across one or a plurality of instances of the component being rendered. For example, a runtime data may be the load time of the component for one instance, while the performance metric may be an average load time of the component for a plurality of instances.

Performance metrics and/or runtime data can be used to determine whether a component should be disabled. For example, if a component is causing a threshold amount of latency or loading errors, it may be deemed unhealthy and disabled. When a component is disabled, it become unavailable and will be excluded from the application when the application is rendered and/or served to a user. Thus, when an application is rendered or served, only available or enabled components are included. The status of each component may be logged in the component database 520. Thus, the content server 512 may access the component database to determine enabled or available components to include in the web application. In some embodiments, when a component is disabled, a notification generator 522 may generate a notification. The notification may be transmitted to a predetermined recipient informing that a component has been disabled and requires attention or further troubleshooting. Once the component is fixed, it may be enabled and available for inclusion in the application again. In some embodiments, a component may be disabled due to transient issues, such as problems with a network, a server, or the user device, rather than problems with the component itself. In such cases, the component may be automatically enabled once the transient issue is resolved.

In various embodiments, when a request is received to the content server 512 for a web application, the content server 512 may access the component database 520 to determine which components are available/enabled for rendering, and access the content database 514 to get obtain the content (e.g., code, data) for rendering the web application with the available components. The web application, with the enabled components is then rendered at the user device 502.

As should be understood, each service and/or component can include one or more computing components, such as at least one server, as well as other components known for providing services, as may include one or more APIs, data storage, and other appropriate hardware and software components. It should be understood that, although the identification services are shown to be part of the provider environment 506 in FIG. 5, that one or more of these identification services might be operated by third parties that offer these services to the provider.

Figure 6:
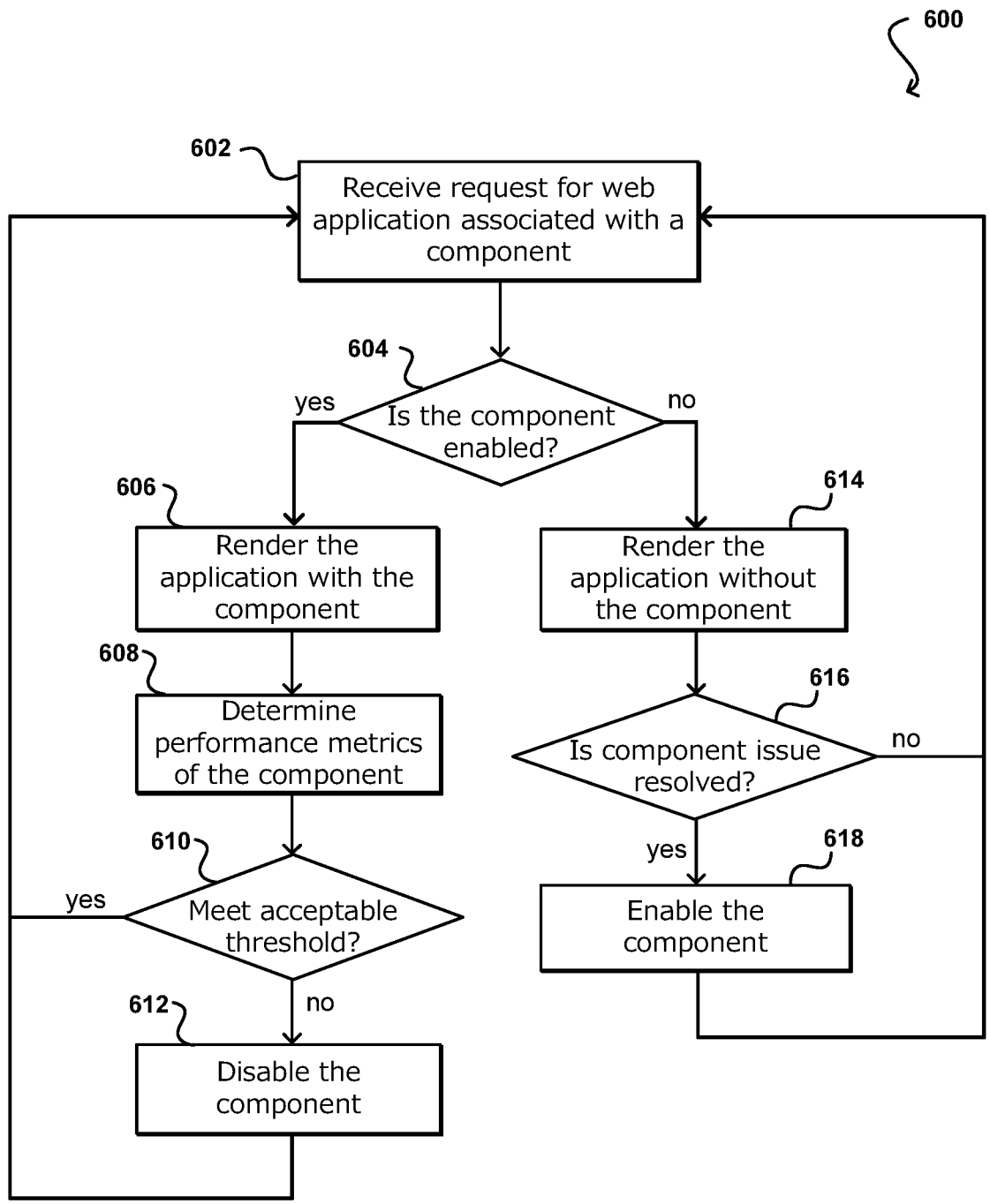
FIG. 6 illustrates an example process for web application self-healing that can be used in accordance with various embodiments.

FIG. 6 illustrates an example process for web application self-healing, in accordance with various embodiments. It should be understood that, for any process discussed herein, there can be additional, fewer, or alternative steps performed in similar or alternative orders, or in parallel, within the scope of the various embodiments. In this example, a request for a web application is received 602. The web application is associated with a component that renders a portion of the user interface, feature, or function of the web application. In some embodiments, the component may be a body of code in the web application or called from the web application. The component may be one among several different components associated with the web application. For example, the web application may be a product search webpage and the component may be an ad generator that determines an ad to display to the user on the product search webpage and renders it on the webpage.

When the request for the web application is received, it is determined 604 whether the component is enabled. In accordance with embodiments of the present disclosure, the component may be in an enabled state or a disabled state, depending on detected health of the component. If the component is in the enabled state, then the web application is rendered with the component in response to the request. When the component is rendered, various performance metrics of the component may be determined 608. The performance metrics may be based on data such as load time of the component, errors, warnings, and exceptions associated with the component, among others. It is then determined 610 whether the performance metrics meet certain acceptable thresholds. This is a factor in determining whether the component is healthy enough to include in the web application, or if its inclusion degrades the performance of the web application or the user experience. Thus, if the performance metrics do not meet the acceptable threshold, the component is disabled 614. If the performance metrics do meet the acceptable threshold, then the component remain in the enabled state.

Referring back to decision block 604, if the component is not enabled when the request is received, then the web application is rendered 614 without the component. Thus, the performance issues associated with the component will be moot and not cause degradation of the overall performance or user experience associated with the web application. When a component is disabled, various actions may occur to attempt to resolve the issue that caused the component to be disabled. For example, a notification may be generated indicating that the component requires attention (e.g., intervention, troubleshooting, debugging). In some embodiments, the issue may be resolved automatically or the component may be replaced with an updated version of the component. In some embodiments, the issue may be a transient issue, such as an offline server, traffic spike, or the like. Such issues may be tracked and the automatically resolved when the transient issue dissipates. In some embodiments, tests may be performed on the disabled component to determine its current performance metrics, as one way of determining whether the issue has been resolved. In some embodiments, the issue may be considered resolved when intervention has occurred or manually set to resolved. Regardless of the means of doing so, it is determined 616 whether the component issue has been resolved. If it has been resolved, such as if the component is updated or a server comes back online, then the component is enabled 618. However, if it is determined that the component issue has not been resolved, then it is not enabled.

As illustrated, the component can be automatically disabled when its performance falls below one or more acceptable thresholds and re-enabled when the performance issue is resolved. Thus, the component is included in the web application when its performance is healthy and not causing performance issues, and not included in the web application when it may cause performance issues. In some embodiments, the component is a non-essential component, and it is better to exclude the component when it is not performing well (e.g., causing slow load time, generating errors) than to include it and potentially degrade the user experience.

Figure 7:
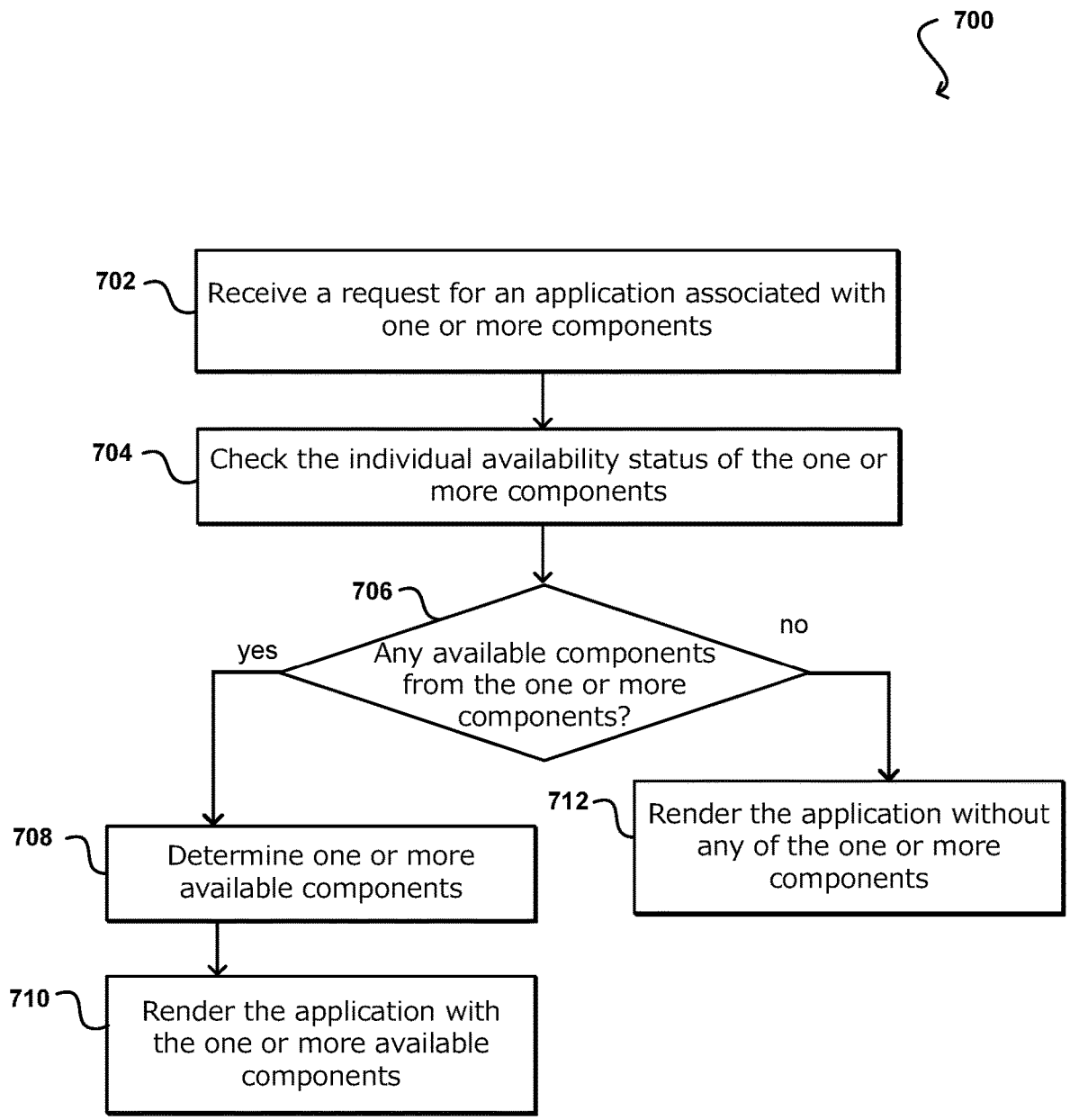
FIG. 7 illustrates another example process for web application self-healing that can be used in accordance with various embodiments.

FIG. 7 illustrates another example process for web application self-healing that can be used in accordance with various embodiments. It should be understood that, for any process discussed herein, there can be additional, fewer, or alternative steps performed in similar or alternative orders, or in parallel, within the scope of the various embodiments. In this example, a request for an application is received 702. In some embodiments, the one or more components may be a subset of components associated with the application, such as those designated as having the option of being turned off and/or not included in the application. For example, the one or more components may refer to a class of components designated as "non-essential" components, while the application may also be associated with other components that are considered essential and not included in the "one or more components" described herein and in FIG. 7. The application may be associated with one or more components. In accordance with embodiments of the present disclosure, when the request is received, the individual availability status of the one or more components is checked 704. Thus, it can be determined 706 if any of the one or more components are available. In some embodiments, the availability status on the individual components is based at least in part on previous performance of the components, respectively. The previous performance of a component may be based at least in part on one or more metrics, including at least one of load time, warnings, errors, exceptions, or the like.

If none of the one or more components are available, then the application may be rendered 712 without any of the one or more components. Referring back to decision block 706, if at least one of the one or more components is available, then one or more available components of the one or more components may be determined 708, and the application is rendered 710 with the one or more available components in response to the request. In some embodiments, the one or more components may include backup components for certain components. For example, if a primary component of the one or more components is unavailable, and a designated backup component is available, the backup component may be rendered with the application. However, it the primary component is available, it is rendered with the application and the backup component is not rendered even if the backup component is available, unless the backup component also serves as a backup component for another primary component that is unavailable.

In some embodiments, when the one or more available components are rendered, respective runtime data of each component may be determined. The runtime data may include various information, such as load time, warnings, errors, exceptions, and the like. The runtime data of a component may be used to determine one or more performance metrics of the components, and the availability status of the component may be updated based at least in part on the performance metrics. In some embodiments, there may be an acceptable performance threshold for each of the one or more performance metrics, and the availability status may be determined based at least in part on whether one or more of the performance acceptable performance thresholds are satisfied, met, or surpassed. For example, is one or more of the thresholds are not met, the component availability status of the component may be set to "unavailable", which manes the component is disabled for inclusion in the application.

In some embodiments, a root cause type associated with the performance metric may be determined, particularly when the performance metric causes the availability status of the component to be set to unavailable. The root cause type may refer to whether the performance issue is caused by a transient issue or a non-transient issue. For example, a transient issue may be one that is resolved on its own, such as a temporarily down server, traffic spike, and the like. A non-transient issue may be one that requires intervention, such as debugging or updating the component. Various protocols may be carried out, depending on the root cause type. For example, if the root cause type is a non-transient issue, a notification may be generated and transmitted to a recipient associated with the component, indicating that the component was having performance issues and has been disabled. In some embodiments, the notification may include a report of the performance issues.

In some embodiments, the unavailable component may be tested by rendering the component under one or more test conditions. For example, testing the component may include rendering the component in an internal testing environment or rendering the component in a live production environment for one or more designated test cases. In some embodiments, "shadow testing" may be performed in a live production environment in which the tested services and dependencies of the component are in the live product stage. This provides a relatively high fidelity testing scenario, thereby decreasing the changes of generating false positives or false negatives. Test performance metrics of the component may be obtained based on the testing, and if it is determined that the test performance metrics meet the acceptable threshold, the availability of the component may be set to available, and it can again be included in the application.

Figure 8:
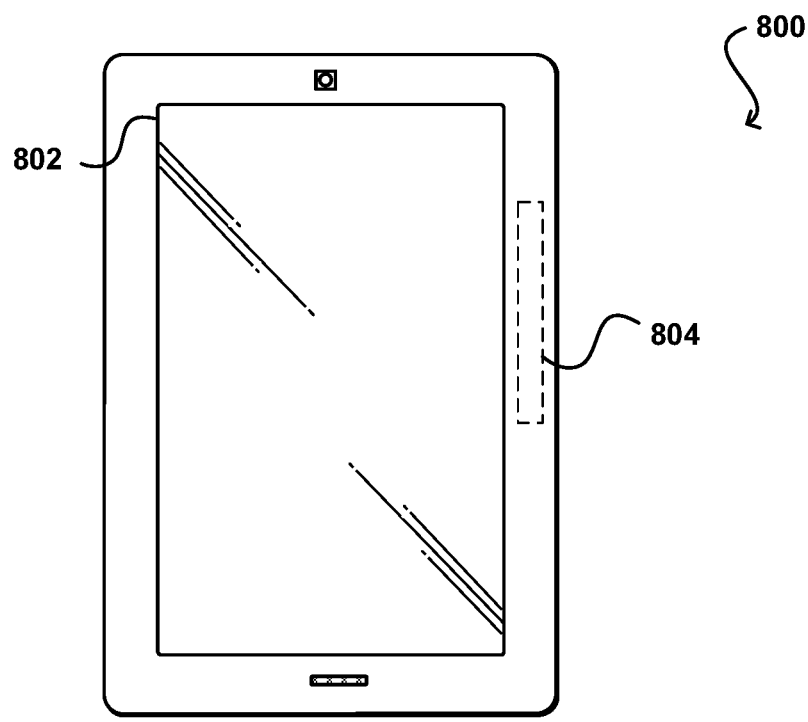
FIG. 8 illustrates an example computing device in accordance with various embodiments.

FIG. 8 illustrates an example electronic user device 800 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 800 has a display screen 802 on the front side, which under normal operation will display information to a user facing the display screen (e.g., on the same side of the computing device as the display screen). It should be understood that computing devices such as servers, however, may not have dedicated display elements. The example computing device 800 also includes at least one networking component 804, such as a network interface card, wireless networking component, and the like, enabling the computing device to communicate information over at least one network.

Figure 9:
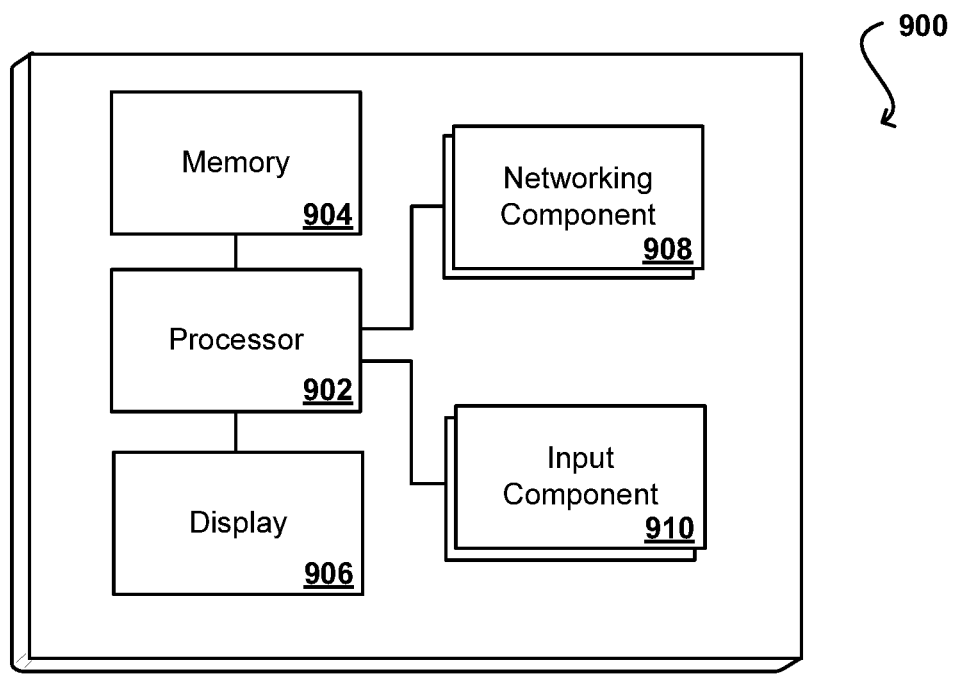
FIG. 9 illustrates example components of a computing device that can be used to implement aspects of various embodiments.

FIG. 9 illustrates a logical arrangement of a set of general components of an example computing device 900 such as the device 800 described with respect to FIG. 8. In this example, the device includes a processor 902 for executing instructions that can be stored in a memory device or element 904. As would be apparent to one of ordinary skill in the art, the device can include many types of memory, data storage, or non-transitory computer-readable storage media, such as a first data storage for program instructions for execution by the processor 902, a separate storage for images or data, a removable memory for sharing information with other devices, etc. The device typically will include some type of display element 906, such as a touch screen or liquid crystal display (LCD), although devices such as portable media players might convey information via other means, such as through audio speakers. In some embodiments, the computing device 900 of FIG. 9 can include one or more networking and/or communication elements 908, such as a Wi-Fi, Bluetooth, RF, wired, or wireless communication system. The device in many embodiments can communicate with a network, such as the Internet, and may be able to communicate with other such devices. In some embodiments the device can include at least one additional input component 910 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

Figure 10:
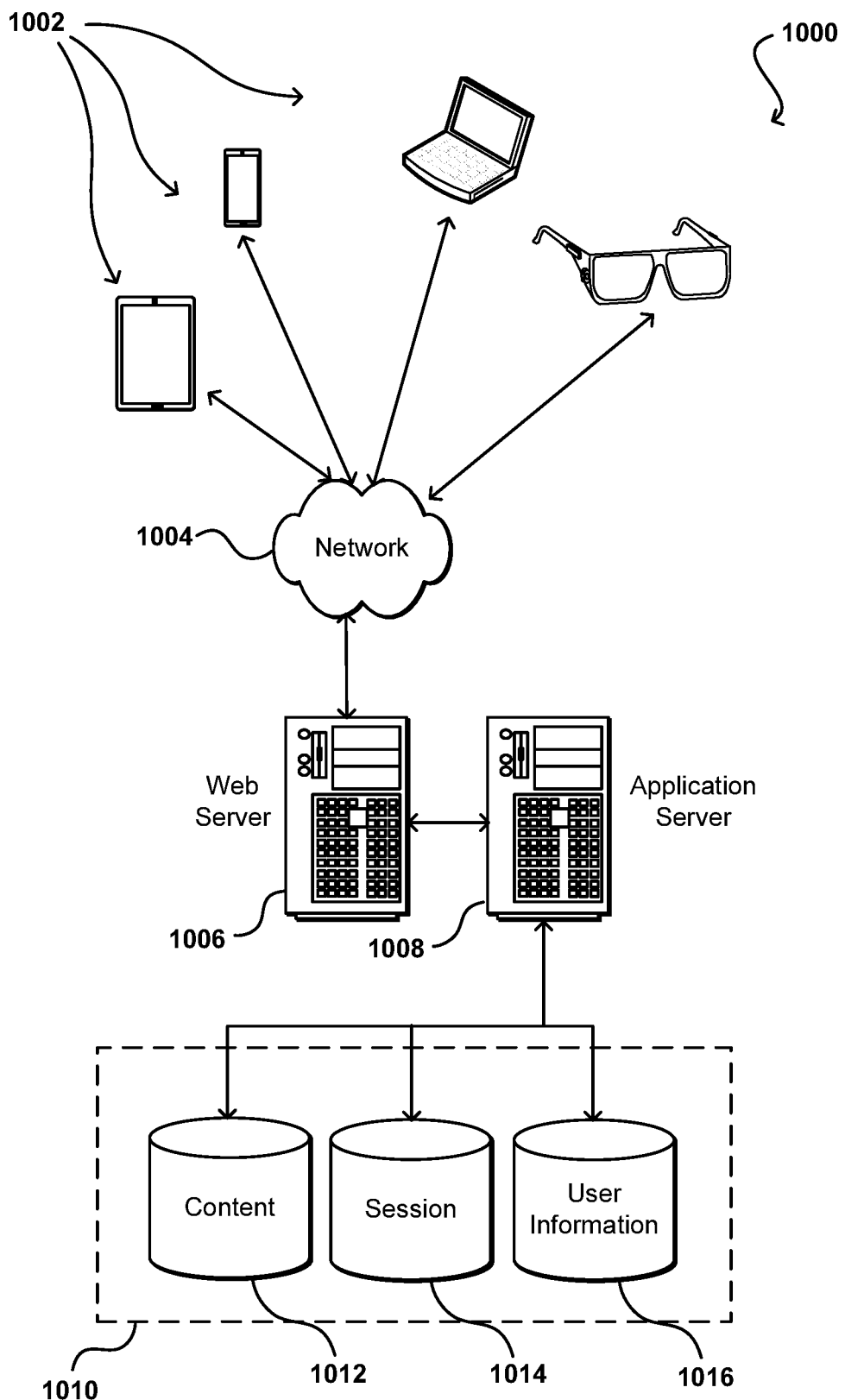
FIG. 10 illustrates an example environment in which aspects of the various embodiments can be implemented.

FIG. 10 illustrates an example environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof.

Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term data "store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006.

It should be understood that the Web and application servers are not required and are merely example components, as structured code discussed herein can be executed on any appropriate device or host machine as discussed elsewhere herein. The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto.

In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser. Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure. The various embodiments can be further implemented in a wide variety of operating environments, which in some cases can include one or more user computers or computing devices which can be used to operate any of a number of applications.

User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network. Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM®. The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN)

familiar to those skilled in the art. Similarly, any necessary files for performing the functions attributed to the computers, servers or other network devices may be stored locally and/or remotely, as appropriate.

Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc. Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information.

The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   at least one computing device processor; and
   a memory device including instructions that, when executed by the at least one computing device processor, cause the system to:
   receive a request for an application, the application including a component;
   render the application including the component;
   obtain runtime data associated with rendering the component;
   determine one or more performance metrics related to operation of the component, based at least in part on the runtime data;
   disable the component upon determining that the one or more performance metrics fails to meet one or more acceptable thresholds, the one or more acceptable thresholds based, at least in part, on an importance of the component;
   determine one or more test performance metrics of the disabled component based at least in part on test runtime data associated with a test rendering of the disabled component;
   enable the disabled component upon the one or more test performance metrics meeting the one or more acceptable thresholds;
   receive a subsequent request for the application; and
   render the application with the enabled component in response to the subsequent request.

2. The system of claim 1, wherein the component corresponds to a user interface feature of the application, and wherein the application does not include the user interface feature when the component is disabled.

3. The system of claim 1, wherein the instructions when executed further cause the system to:
   test the disabled component to obtain test runtime data associated with rendering of the disabled component.

4. The method of claim 1, wherein the runtime data includes at least one of latency, availability losses, warnings, errors, or exceptions.

5. A computer-implemented method, comprising:
   receiving a request for an application, the application associated with one or more components;
   determining a respective availability status of individual components of the one or more components, the availability status based at least in part on respective previous performance of the one or more components with respect to respective performance thresholds related to operation of the one or more components, the respective performance thresholds based at least in part on an importance of the one or more components;
   determining that a first component of the one or more components is unavailable;
   determining an available backup component, for the first component, from the one or more components, based at least in part on the respective availability status of the individual components; and
   rendering the application with the available backup component in response to the request.

6. The method of claim 5, wherein the previous performance of a component is based at least in part on one or more metrics, including at least one of latency, availability losses, warnings, errors, or exceptions.

7. The method of claim 5, wherein the application is associated with essential components and non-essential components, and the one or more components are non-essential components.

8. The method of claim 5, further comprising:
   determining runtime data of a component of the one or more available components during rendering of the application;
   determining a performance metric of the component based at least in part on the runtime data; and updating the availability status of the component based at least in part on the performance metric.

9. The method of claim 8, further comprising:
determining that the performance metric fails to meet a threshold for the component; and
updating the availability status of the component to unavailable.

10. The method of claim 9, further comprising:
determining a root cause type associated with the performance metric; and
carrying out a protocol associated with the root cause type.

11. The method of claim 10, further comprising:
wherein the root cause type is one of a transient issue that does not require intervention or a non-transient issue that requires intervention.

12. The method of claim 10, further comprising:
transmitting a notification to a recipient associated with the component, the notification including information associated with the availability status of the component.

13. The method of claim 9, further comprising:
testing the component by rendering the component under one or more test conditions;
obtaining a test performance metric of the component based on the testing;
determining that the test performance metric meets the threshold; and
updating the availability status of the component to available.

14. The method of claim 13, wherein testing the component includes rendering the component in an internal testing environment or rendering the component in a live production environment for one or more designated test cases.

15. A system, comprising:
at least one computing device processor; and
a memory device including instructions that, when executed by the at least one computing device processor, cause the system to:
receive a request for an application, the application associated with one or more components;
determine a respective availability status of individual components of the one or more components, the respective availability status based at least in part on respective previous performance of the one or more components with respect to respective performance thresholds related to operation of the one or more components, the respective performance thresholds based at least in part on an importance of the one or more components;
determine that a first component of the one or more components is unavailable;
determine an available backup component, for the first component, from the one or more components, based at least in part on the respective availability status of the individual components; and
render the application with the available backup component in response to the request.

16. The system of claim 15, wherein the instructions when executed further cause the system to:
determine runtime data of a component of the one or more available components during rendering of the application;
determine a performance metric of the component based at least in part on the runtime data; and
update the availability status of the component based at least in part on the performance metric.

17. The system of claim 16, wherein the instructions when executed further cause the system to:
determine that the performance metric fails to meet a threshold for the component; and
update the availability status of the component to unavailable.

18. The system of claim 17, wherein the instructions when executed further cause the system to:
determine a root cause type associated with the performance metric; and
carry out a protocol associated with the root cause type.

19. The system of claim 17, wherein the instructions when executed further cause the system to:
test the component by rendering the component under one or more test conditions;
obtain a test performance metric of the component based on the testing;
determine that the test performance metric is within the threshold; and
update the availability status of the component to available.

* * * * *